(12) United States Patent
Anghel et al.

(10) Patent No.: US 8,680,734 B2
(45) Date of Patent: Mar. 25, 2014

(54) COMPACT STARTER-GENERATOR WITH COMMON CORE FOR MAIN AND EXCITER WINDING

(75) Inventors: Cristian Anghel, Oro Valley, AZ (US); Parsa Mirmobin, Tucson, AZ (US); Ming Xu, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 721 days.

(21) Appl. No.: 12/833,265

(22) Filed: Jul. 9, 2010

(65) Prior Publication Data

US 2011/0304224 A1 Dec. 15, 2011

Related U.S. Application Data

(60) Provisional application No. 61/353,767, filed on Jun. 11, 2010.

(51) Int. Cl.
*H02K 19/00* (2006.01)
*H02K 3/00* (2006.01)

(52) U.S. Cl.
USPC ............ 310/180; 310/184; 310/195; 310/198

(58) Field of Classification Search
USPC ................................. 310/179–208
See application file for complete search history.

(56) References Cited

U.S. PATENT DOCUMENTS

| | | | |
|---|---|---|---|
| 4,223,263 A | 9/1980 | Hansen, Jr. et al. | |
| 4,488,136 A | 12/1984 | Hansen et al. | |
| 4,517,484 A | 5/1985 | Dacier | |
| 5,783,839 A | 7/1998 | Morikawa et al. | |
| 6,133,659 A | 10/2000 | Rao | |
| 6,175,209 B1 * | 1/2001 | Fei | 318/776 |
| 6,188,204 B1 * | 2/2001 | Vithayathil et al. | 322/29 |
| 6,424,065 B1 | 7/2002 | Vlemmings et al. | |
| 6,965,182 B2 * | 11/2005 | Jeong et al. | 310/180 |
| 7,142,081 B1 | 11/2006 | Shudarek | |
| 7,230,363 B2 | 6/2007 | Stout et al. | |
| 7,370,716 B2 | 5/2008 | Hickam | |
| 7,863,868 B2 * | 1/2011 | Xu et al. | 322/44 |
| 7,915,869 B2 * | 3/2011 | Xu et al. | 322/59 |
| 8,022,588 B2 * | 9/2011 | Yoshino et al. | 310/216.071 |
| 2009/0243417 A1 | 10/2009 | Xu et al. | |

* cited by examiner

*Primary Examiner* — Tran Nguyen
*Assistant Examiner* — Leda Pham
(74) *Attorney, Agent, or Firm* — Shimokaji & Associates, P.C.

(57) ABSTRACT

A power system for a vehicle may comprise an electric machine attached to an engine of the vehicle. The electric machine may comprise only one stator core; a stator main winding wound on the one stator core; a stator exciter winding wound on the one stator core. The stator main winding and the stator exciter winding may be magnetically independent from one another even though magnetic-field-isolation material is not interposed between the stator main winding and the stator exciter winding.

20 Claims, 10 Drawing Sheets

COMPACT STARTER-GENERATOR WITH COMMON CORE FOR MAIN AND EXCITER WINDING

RELATED APPLICATIONS

This application claims benefits of Provisional Application 61/353,767 filed on Jun. 11, 2010.

BACKGROUND OF THE INVENTION

The present invention generally relates to electrical power in a vehicle. More particularly, the present invention relates to vehicular electric machines (starters, generators and starter-generators).

In some vehicles, it has been found desirable to insert an electric machine directly between an output shaft of an engine and a transmission of the vehicle. This may be a particularly desirable arrangement when the vehicle has on-board electrical loads which require large amounts of power and the electric machine may have a large electrical output capacity. In such an arrangement, the electric machine may be positioned so that it consumes minimal space in an engine/transmission envelope. In other words, the electric machine may be positioned coaxially with a drive shaft of the engine and may not need to be placed alongside the engine. Typically such coaxially positioned electric machines are constructed as permanent magnet (PM) electric machines. PM electric machines may produce power with a voltage that varies as a function of their rotational speed and the electrical load. When such machines are driven by a variable speed engine, their output must be conditioned prior to being delivered to electrical loads.

In some vehicle electrical systems, it is desirable to employ wound field starter-generators. Such wound field machines may produce output power that may be controlled to a fixed voltage even though rotational speed of, and/or the electrical load on, the wound field machine may vary. Wound field machines may have advantages in vehicular applications because they may output power that may not require use of power conditioning equipment. Thus overall weight and cost of a wound-field based electrical system may be lower than that of a PM-based electrical system because there may be no need for on-board power conditioning equipment.

In spite of some desirable features of wound-field systems, PM systems have heretofore been employed in applications that require a coaxial arrangement of a starter-generator with its respective engine output shaft. This is because a typical PM machine may be constructed with a smaller axial length than a typical wound field machine. To achieve brushless operation a typical wound field machine may consist of an exciter generator and a main generator. Thus two generators may consume side-by-side space in many wound-field machine designs. Some newly developed wound field machines have their exciter generators and their main generators concentrically arranged in a so-called "low profile" configuration. Such a machine is described in U.S. Pat. No. 7,230,363, which is incorporated by reference herein.

While the concentrically arranged wound-field machine of U.S. Pat. No. 7,230,363 may have a desirably small envelope, it nevertheless is not configured for positioning between an engine and a transmission coaxially with an output shaft of an engine. This is because the machine of U.S. Pat. No. 7,230,363 does not have a configuration for transferring mechanical power to the vehicle transmission.

As can be seen, there is a need for an electrical system that employs a low-profile, wound field electric machine which may be positioned between an engine output shaft and a transmission of the vehicle.

SUMMARY OF THE INVENTION

In one aspect of the present invention, a power system for a vehicle may comprise an electric machine attached to an engine of the vehicle; the electric machine may comprise: only one stator core; a stator main winding wound on the one stator core; a stator exciter winding wound on the one stator core; wherein the stator main winding and the stator exciter winding are magnetically independent from one another; and wherein magnetic separation between the stator main winding and the stator exciter winding is provided without interposing magnetic-field-isolation material.

In another aspect of the present invention, an electric machine may comprise a common stator core surrounding an axis; a stator exciter winding wound on the common stator core; a stator main winding wound on the common stator core; wherein the stator exciter winding produces stator-exciter-flux which interacts with the stator main winding to produce flux-induced voltage in the stator main winding but does not produce flux-induced current in the stator main winding; and wherein the stator main winding produces stator-main-flux which interacts with stator exciter winding to produce flux-induced voltage in the stator exciter winding but does not produce flux-induced current in the stator exciter winding.

In still another aspect of the invention, a method for operating an electric machine may comprise the steps of producing flux with a stator exciter winding wound on a common stator core; inducing voltage in portions of the stator main winding wound on the common stator core so that there is no flux-induced current in the stator main winding as a result of flux from the stator exciter winding; producing flux with the stator main winding wound on the common stator core; and inducing voltage in portions of the stator exciter winding wound on the common stator core so that there is no flux-induced current in the stator exciter winding as a result of flux from the stator main winding and so that the electric machine is operable without intervening magnetic-field-isolation elements between the stator main winding and the stator exciter winding.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a vehicular electrical system in which a wound field electric machine may be positioned between an engine output shaft and a transmission of a vehicle so that the electric machine may be directly driven by the engine and so that the engine may directly deliver mechanical power to the transmission. The electric machine may have its exciter windings and its main windings placed on common cores without intervening or interposed magnetic isolation elements between the windings. The wound field electric machine may advantageously have a low profile configuration.

Figure 1:
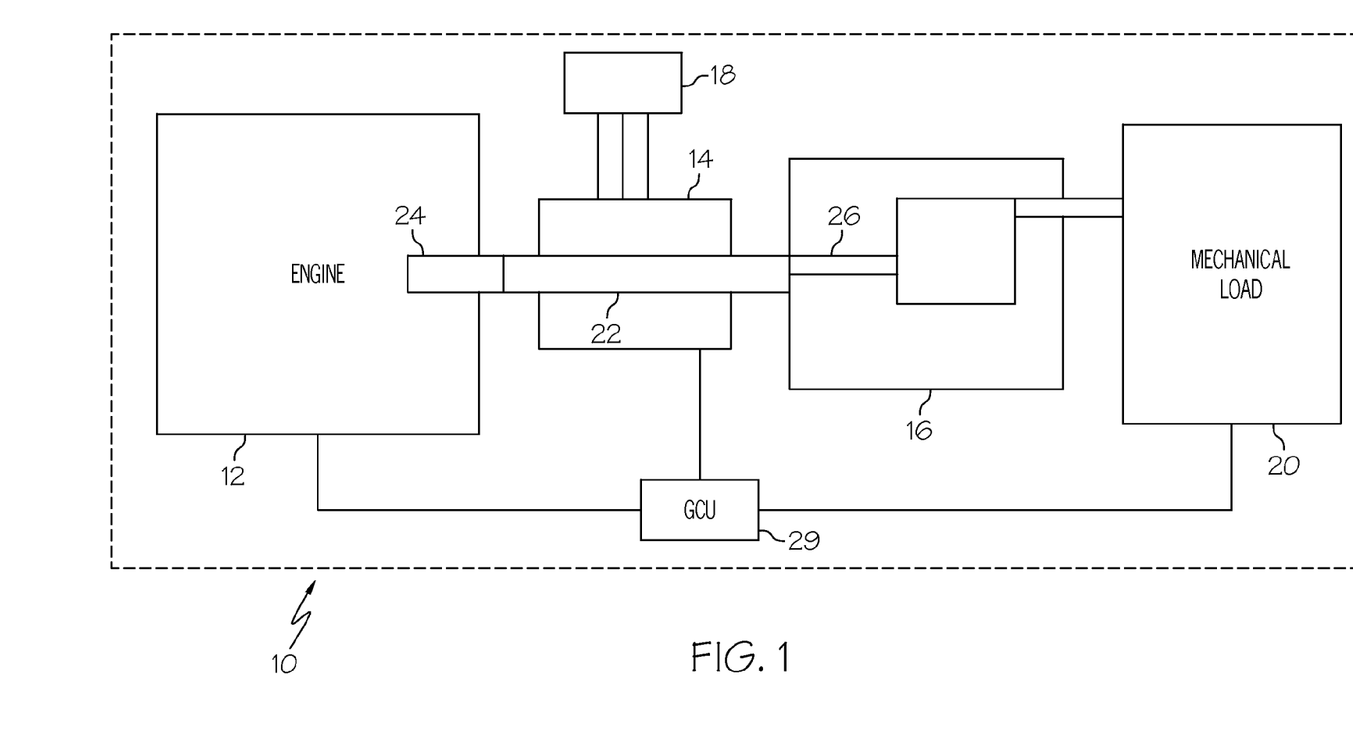
FIG. 1 is a block diagram of an electrical power system in accordance with an embodiment of the invention.

Referring now to FIG. 1, a block diagram may illustrate an embodiment of the present invention. A power system 10 for a vehicle (not shown) may comprise an engine 12, an electric machine 14, a transmission 16, electrical loads 18 and mechanical loads 20. The electric machine 14 may be a wound-field generator or starter/generator. The electric machine 14 may have a driving member 22 (e.g., a shaft or a driving hub) which may be aligned coaxially with an engine power output shaft 24. Similarly, the transmission 16 may have a power input shaft 26 which may be aligned coaxially with the driving member 22. The transmission 16 may be positioned to deliver mechanical power to the mechanical loads 20. The electric machine 14 may be connected to deliver electrical power to the electrical loads 18.

A generator control unit (GCU) 29 may control excitation of the electric machine 14 responsively to variations of generator output voltage. Electrical power output of the electric machine 14 may have constant voltage irrespective of the rotational speed of the engine 12 or magnitude of the electrical loads 18.

Figure 2:
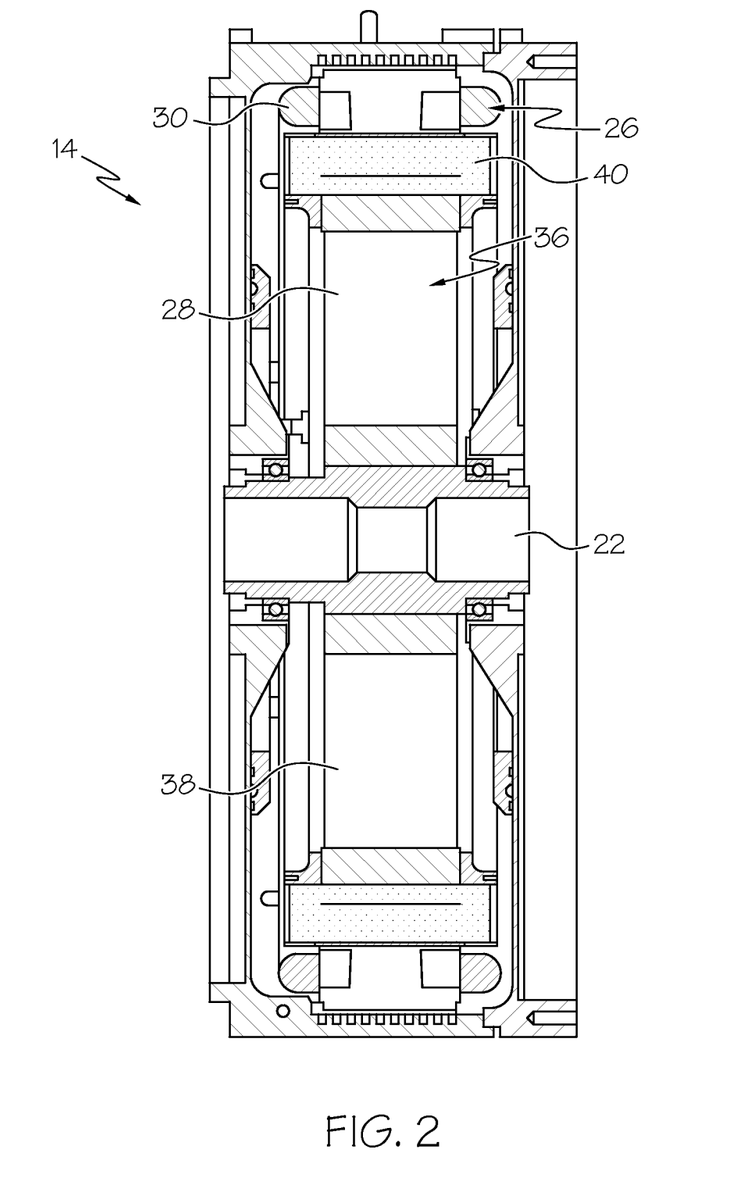
FIG. 2 is a cross-sectional view of an electric machine in accordance with an embodiment of the invention.
Figure 3:
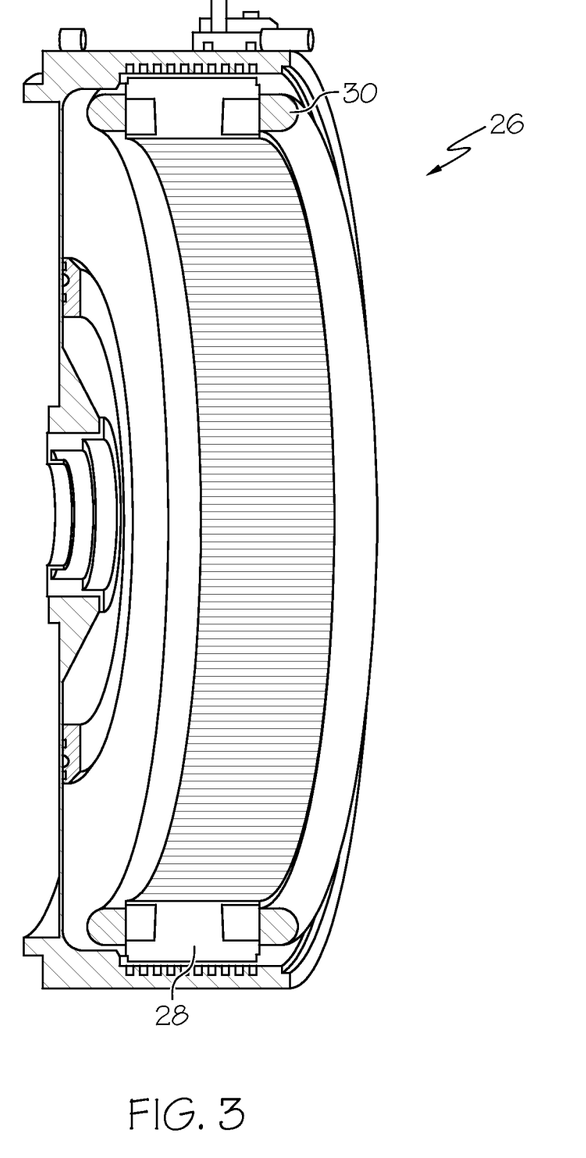
FIG. 3 is a cross-sectional view of a stator of the electric machine of FIG. 2 in accordance with an embodiment of the invention.
Figure 4:
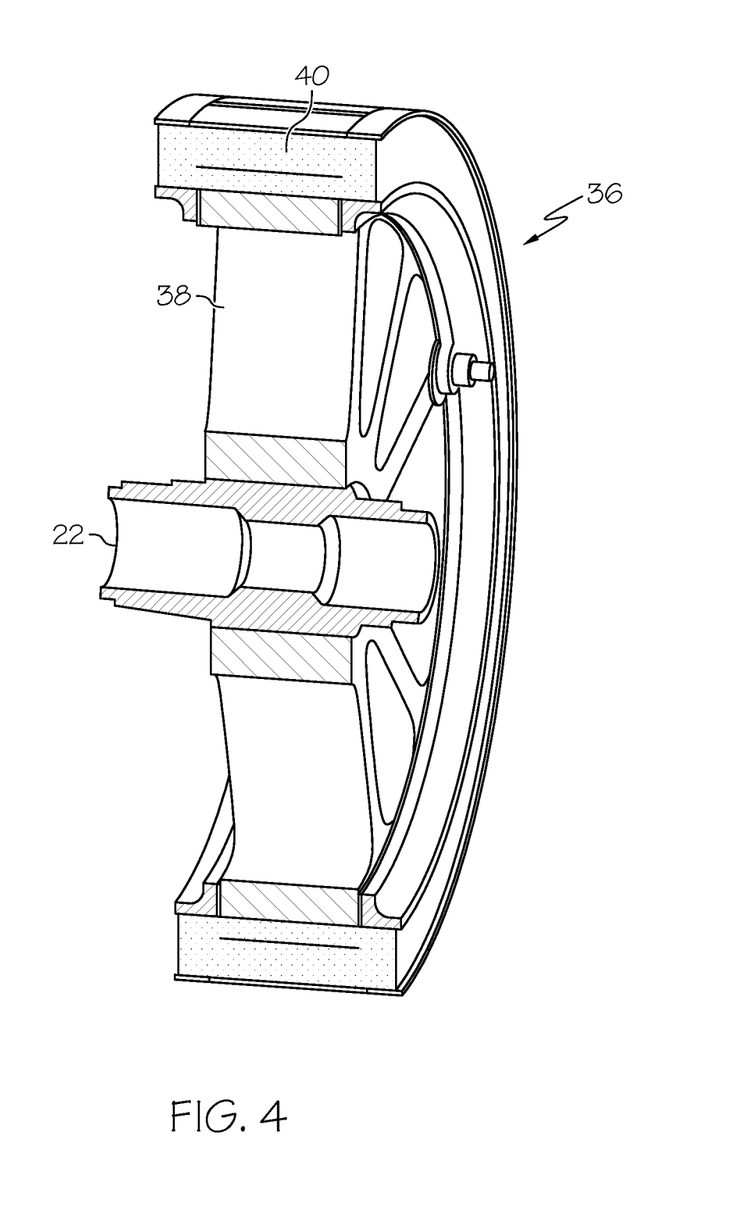
FIG. 4 is a cross-sectional view of a rotor of the electric machine of FIG. 2 in accordance with an embodiment of the invention
Figure 11:
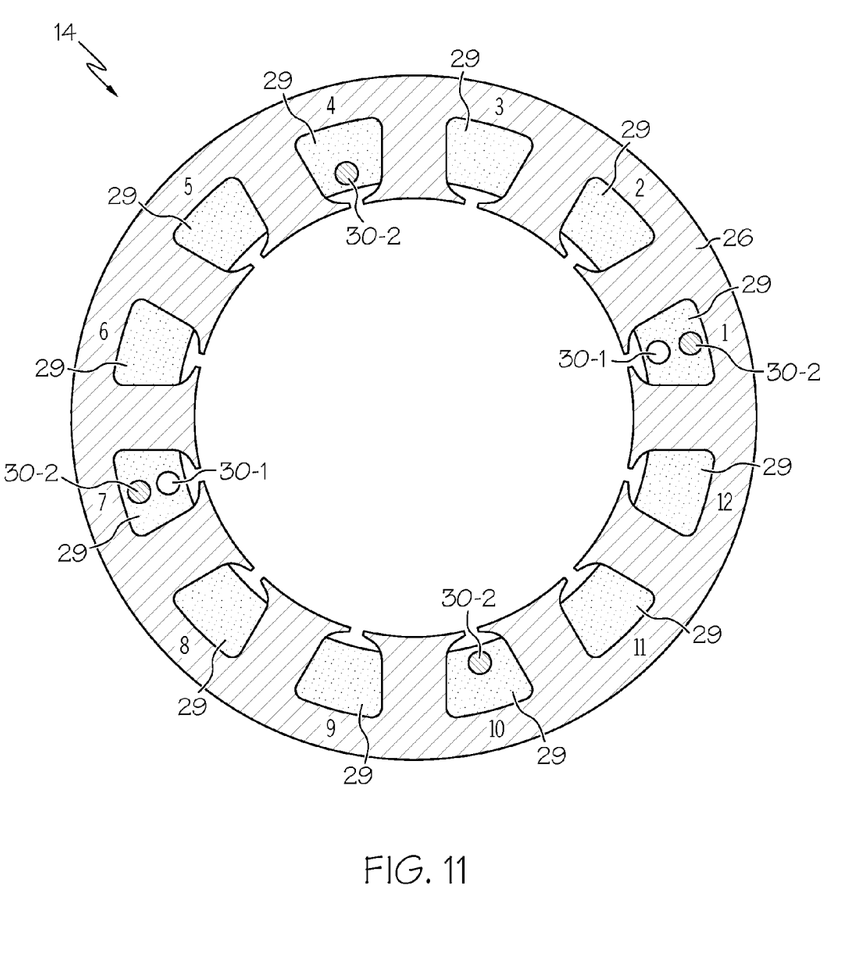
FIG. 11 is a schematic view of the electric machine of FIG. 2 showing a physical relationship of windings on a stator in accordance with an embodiment of the invention.

Referring now to FIGS. 2, 3 and 4 cross sectional views of the electric machine 14 are shown. FIG. 3, in particular, may illustrate a stator 26 which may comprise a common stator core 28 and combined stator windings 30. The combined stator windings 30 may comprise both a stator exciter winding 30-1 and a stator main winding 30-2. (The windings 30-1 and 30-2 are not shown individually in FIGS. 2 and 3 and but are described in FIG. 11). The stator exciter winding 30-1 and the stator main winding 30-2 may be wound on the common stator core 28 in various pole configurations as will be hereinafter described.

Figure 12:
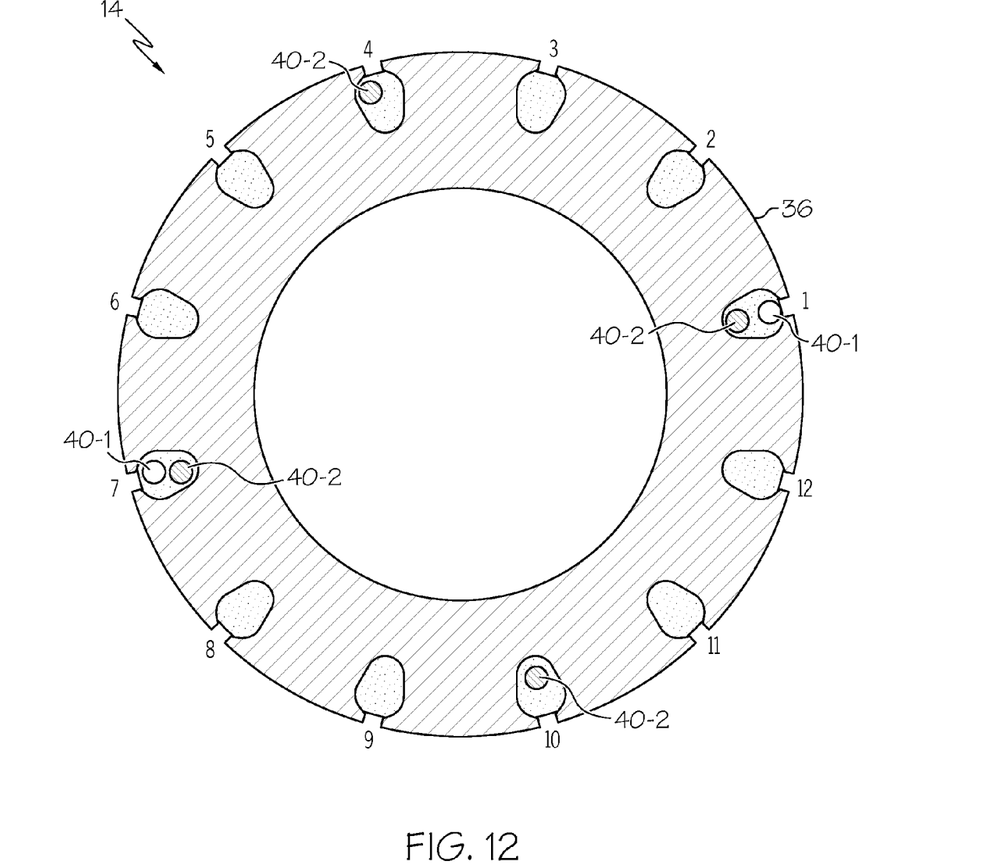
FIG. 12 is a schematic view of the rotor of FIG. 4 showing a physical relationship of windings on the rotor in accordance with an embodiment of the invention.

FIG. 4 may illustrate a rotor 36 that may comprise a common rotor core 38 and combined rotor windings 40. The combined rotor windings 40 may comprise both rotor exciter winding 40-1 and rotor main winding 40-2 (The windings 40-1 and 40-2 are not shown individually in FIG. 4 and but are described in FIG. 12). The rotor exciter winding 40-1 and the rotor main winding 40-2 may be wound on the common rotor core 38 in various pole configurations as will be hereinafter described.

Because the stator exciter winding 30-1 and the stator main winding 30-1 may be wound on the common rotor core 28, the windings 30-1 and 30-2 may need to be magnetically isolated from one another. In accordance with an embodiment of the present invention such magnetic isolation may be achieved by appropriately assigning relative pole configurations for the windings 30-1 and 30-2. With appropriate relative pole configurations, the windings 30-1 and 30-2 may be magnetically isolated without magnetic-field-isolation members (e.g., non-magnetic metallic alloys) being interposed between the windings even though they may be wound on the common core 28.

Figure 5:
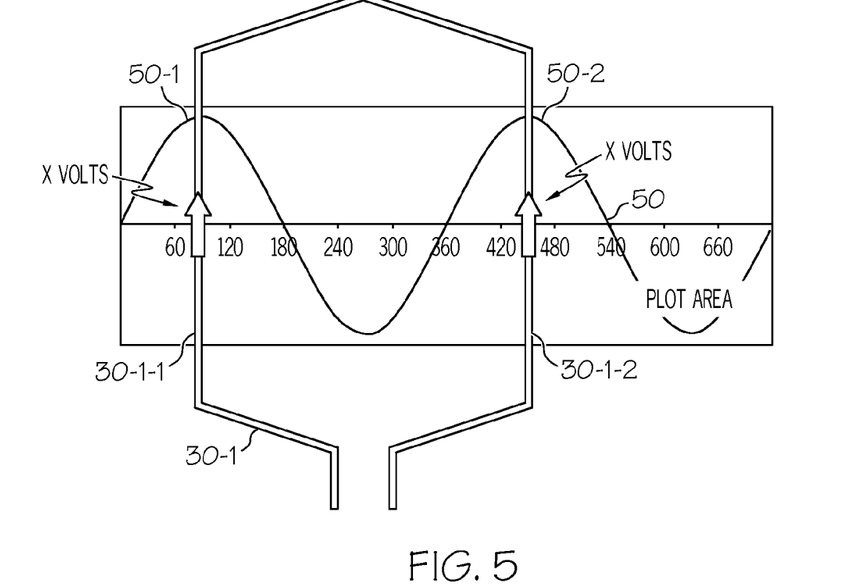
FIG. 5 is an interaction diagram of flux of a main winding on an exciter winding in accordance with an embodiment of the invention.
Figure 6:
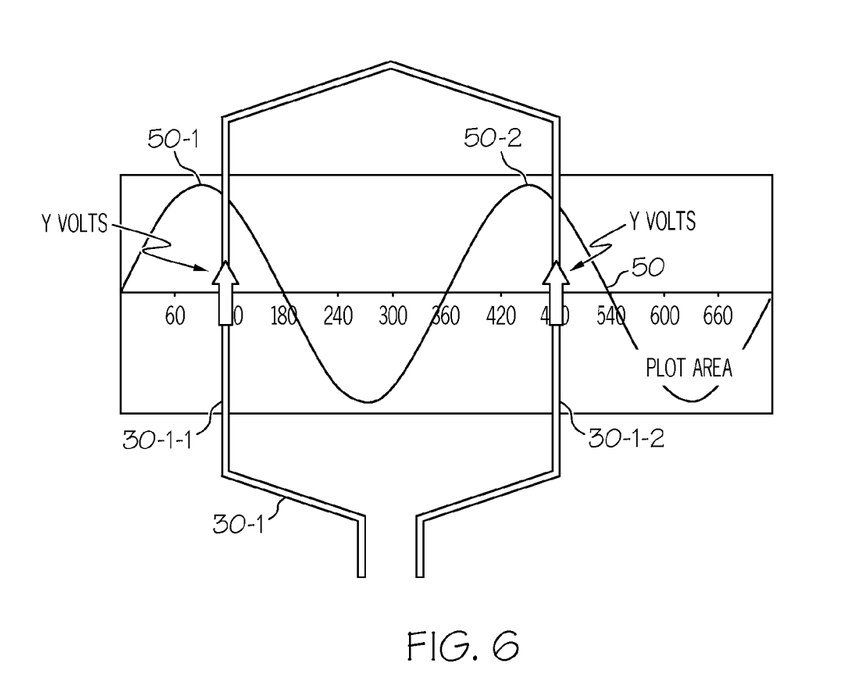
FIG. 6 is a second interaction diagram of flux of a main winding on an exciter winding in accordance with an embodiment of the invention.

Referring now to FIGS. 5 and 6, an effect of assigning appropriate relative pole configurations may be illustrated. FIG. 5 may illustrate the stator exciter winding 30-1 in an exemplary 2 pole configuration. FIG. 5 shows a O-pole flux pattern 50 (flux intensity vs. electrical degrees of rotation) which may be generated by the stator main winding 30-2 when the winding 30-2 is wound in a 4 pole configuration. In that context, it may be seen that at a first positive peak 50-1 of the flux 50, a first portion 30-1-1 of the stator exciter winding 30-1 may experience an induced voltage X. Simultaneously, a second portion 30-1-2 of the stator exciter winding 30-1 may experience an induced voltage that may also equal X as a result of a second positive peak 50-2 of flux which may be equal in amplitude to the first positive peak of flux 50-1. As a result of these two equal induced voltages, a net current in the stator exciter winding 30-1 induced by the flux 50 may remain zero. In other words, the winding 30-1 and 30-2 may be magnetically isolated since current in the exciter winding 30-1 may remain independent of the flux 50 in the rotor main winding 30-2.

It may be noted that the flux pattern 50 may be generated either by the rotor main winding 40-2 alone (typical under no load conditions) or by the combined effect of both the stator main winding 30-2 and rotor main winding 40-2 (typical under load conditions).

FIG. 6 may graphically illustrate that, irrespective of rotational configuration of the flux 50, induced voltage in the two portions 30-1-1 and 30-1-2 of the stator exciter winding 30-1 may result in zero flux induced current.

This may be so even though the induced voltage may be equal to Y, a value lower than voltage X of FIG. 5.

Figure 7:
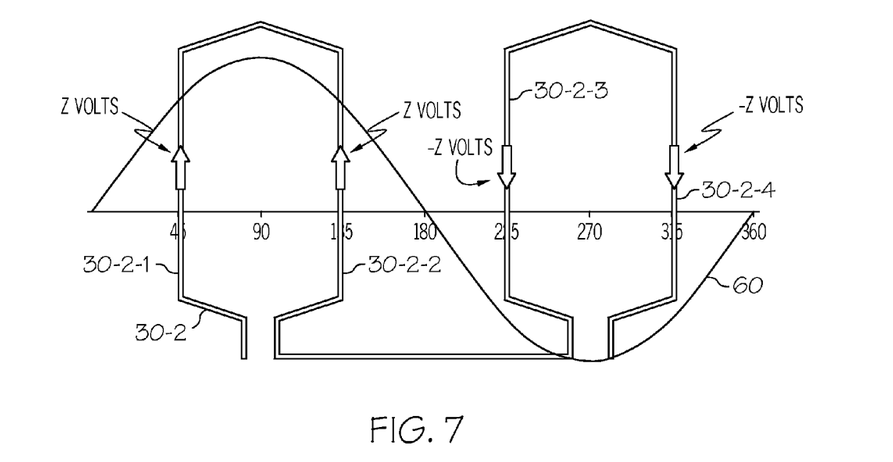
FIG. 7 is an interaction diagram of flux of an exciter winding on a main winding in accordance with an embodiment of the invention.
Figure 8:
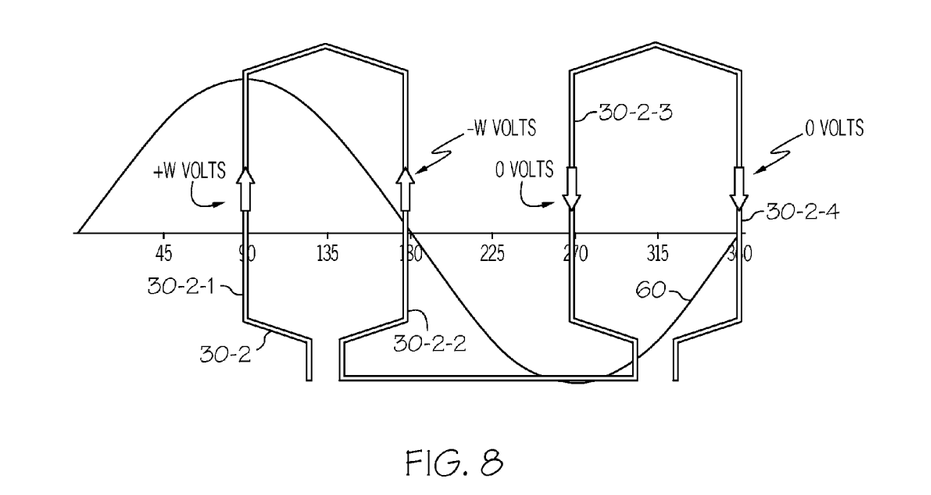
FIG. 8 is a second interaction diagram of flux of an exciter winding on a main winding in accordance with an embodiment of the invention.
Figure 9:
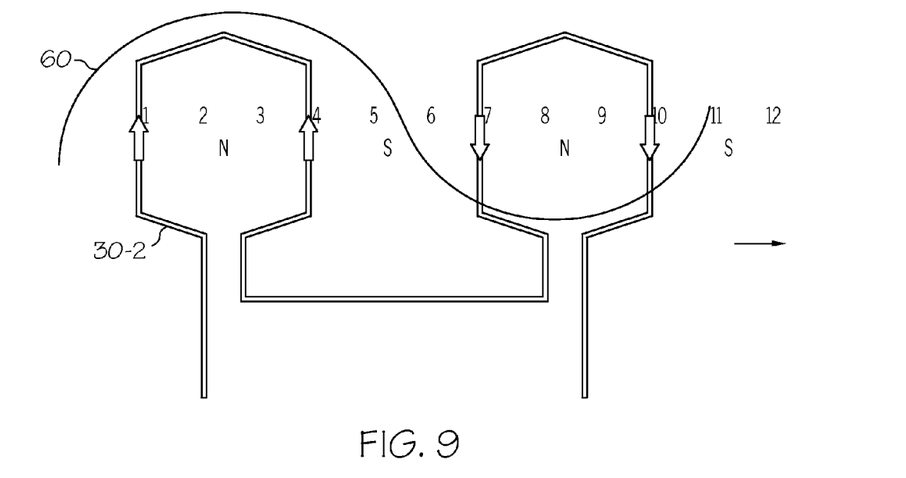
FIG. 9 is diagram of a relationship of a 4 pole main winding to a 2 pole exciter winding in accordance with an embodiment of the invention.
Figure 10:
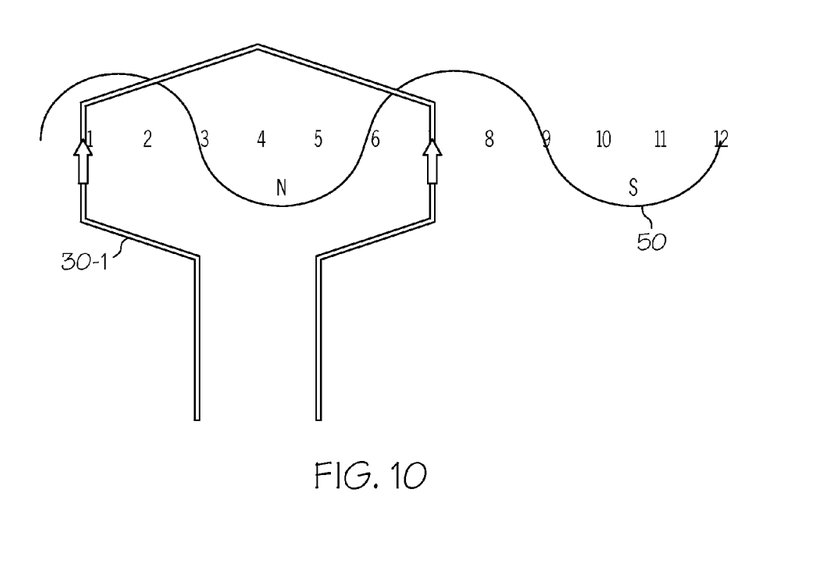
FIG. 10 is a diagram of a relationship of a 2 pole exciter winding to a 4 pole main winding in accordance with an embodiment of the invention.

Referring now to FIGS. 7 and 8, it may be seen that a converse to the condition of FIGS. 5 and 6 may exist relative to flux induced current in the stator main winding 30-2 as a result of flux 60 from the stator exciter winding 30-1. A first portion 30-2-1 of winding 30-2 may have a voltage +Z induced therein by the flux 60. Simultaneously a second portion 30-2-2 may have a voltage +Z induced therein. Consequently there may be no flux induced current in these first and second portions.

Similarly, a third portion 30-2-3 of the winding 30-2 may have a voltage −Z induced therein and a fourth portion 30-2-4 may have a corresponding voltage −Z induced herein. Thus, there may be no flux induced current in the third and fourth portions.

FIG. 8 illustrates a rotational flux position which is different from that of FIG. 7. In FIG. 8, the first portion 30-2-1 may have an induced voltage of +W induced therein. The second portion may have no voltage induced therein. The third portion 30-2-3 may have a voltage −W induced therein and the fourth portion 30-2-4 may have no induced voltage. It may be seen that because the first, second, third and fourth portions are interconnected, there may be no net current in the winding 30-2 as a result of flux from the winding 30-1.

It may be noted that the rotor windings 40-1 and 40-2 may be similarly arranged so each winding is magnetically isolated from the other.

Referring now to FIGS. 9, 10, 11 and 12, it may be seen how the exemplary 4-pole/2-pole arrangement of FIGS. 4-8 may be implemented in an exemplary 3-phase one of the electric machines 14 in which the common stator core 28 may have twelve slots 29. As a general matter, it may be seen that a first portion of the stator exciter winding 30-1 and a first portion of the stator main winding 30-2 may be positioned in the same slot. At least one of the slots may be occupied by a second portion of the stator main winding 30-2 but not occupied by any portion of the stator exciter winding 30-1. More specifically, it may be seen that the 4-pole stator main winding 30-2 may be wound in slots 29-1, 29-4, 29-7 and 29-10. The 2 pole stator exciter winding 30-1 may be wound in slots 29-1 and 29-7. As described above with respect to FIGS. 4-8, even though the windings 30-1 and 30-2 may be adjacent to each other in slots 29-1 and 29-7, there may be no magnetic coupling between the windings. Consequently, the windings 30-1 and 30-2 may be energized independently of one another. It may be noted that in FIGS. 9-10, only one phase of stator exciter winding 30-1 and one phase of stator main winding 30-2 are shown; both windings 30-1 and 30-2 could be multi-phase windings, for example, 3 phases or 6 phases.

While the present invention has been described in the context to a 4-pole/2-pole configuration, it may be recognized that the electric machine 14 may be constructed with many possible combinations of exciter poles and main poles. For example, it may be possible to build the electric machine 14 with 36 main poles and 12 exciter poles. The electric machine may be configured with any pole relationship in which the exciter poles are an integer multiple or divisor of a number of the main poles and in which the number of exciter poles differs from the number of main poles.

It may also be possible to build the electric machine 14 with a third set of windings (not shown) interposed with and magnetically isolated from the exciter winding and the main winding. This third set of winding may be useful to provided the electric machine with two different voltage levels of output.

Figure 13:
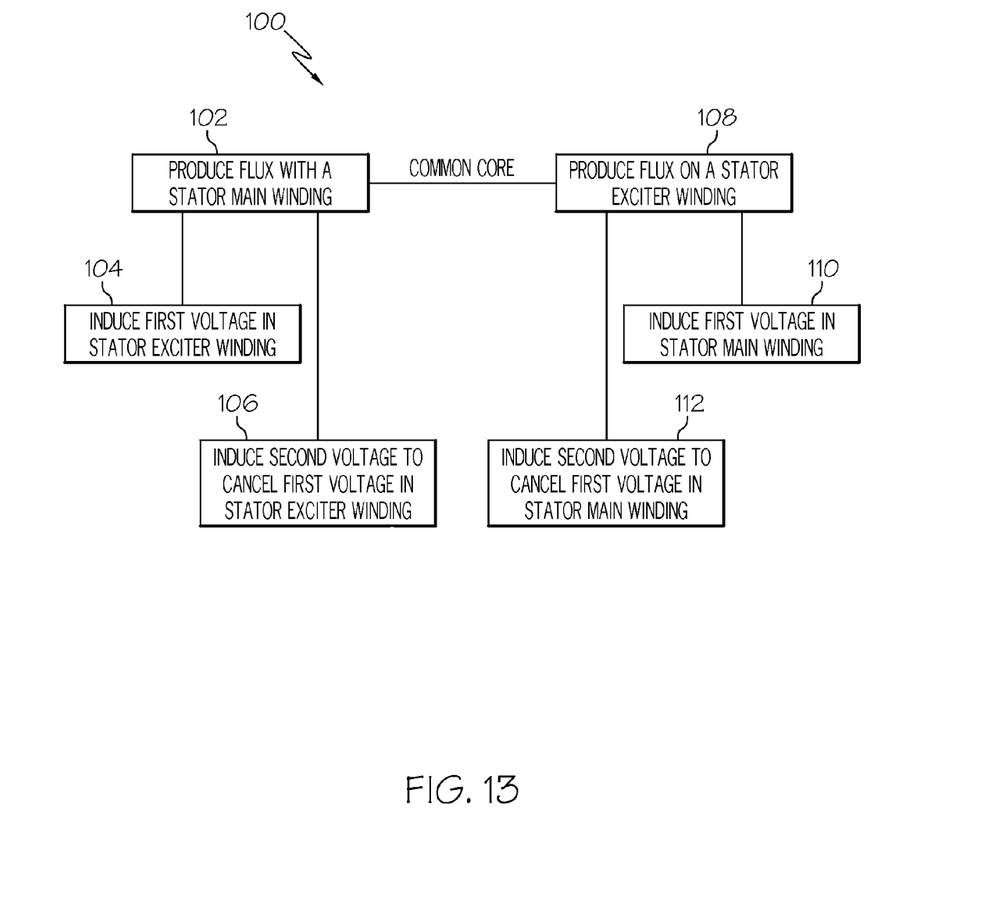
FIG. 13 is a flow chart of a method of operating an electric machine in accordance with an embodiment of the invention.

Referring now to FIG. 13, a flow chart 100 may illustrate an exemplary method which may be employed to operate the electric machine 14 in accordance with an embodiment the invention. In a step 102, flux may be produced with a stator main winding (e.g., the flux 50 may be produced by the stator main winding 30-2). In step 104, a first voltage maybe induced in a stator exciter winding (e.g., the voltage X may be induced in the first portion 30-1-1 of the winding 30-1). In a step 106, occurring simultaneously with the step 104, a second voltage may be induced to cancel effects of the first induced voltage in stator exciter winding (e.g., a voltage X may be induced in the second portion 30-1-2 of the winding 30-1 so that flux-induced current does not develop in the winding 30-1).

In a step 108, flux may be produced with a stator exciter winding (e.g., the flux 60 may be produced by the stator exciter winding 30-1). In step 110, a first voltage maybe induced in a stator main winding (e.g., the voltage +W may be induced in the first portion 30-2-1 of the winding 30-2). In a step 112, occurring simultaneously with the step 110, a second voltage may be induced to cancel effects of the first induced voltage in stator exciter winding (e.g., a voltage −W may be induced in the third portion 30-2-3 of the winding 30-2 so that flux-induced current does not develop in the winding 30-2).

It should be appreciated that at the above steps, the flux 60 may be initially generated by the stator exciter winding 30-1 when it is excited. Once this flux is generated, there may be induced current in the exciter rotor winding 40-1 which in turn may generate a similar flux pattern since both windings have the same pole number. The flux 60 may be eventually maintained by the combined effect of both exciter stator winding 30-1 and exciter rotor windings 30-2. Similarly the flux 50 may be eventually maintained by the combined effect of both stator main winding 30-2 and rotor main winding 40-2.

It should be understood, of course, that the foregoing relates to exemplary embodiments of the invention and that modifications may be made without departing from the spirit and scope of the invention as set forth in the following claims.

We claim:

1. A power system for a vehicle comprising:
an electric machine attached to an engine of the vehicle, the electric machine comprising:
only one stator core;
a stator main winding wound on the one stator core;
a stator exciter winding wound on the one stator core;
wherein the stator main winding and the stator exciter winding are magnetically independent from one another;
wherein the stator exciter winding has a first coil side and a second coil side that are configured to have equal induced voltages that cancel each other, wherein the induced voltages are created by the main winding; and
wherein magnetic separation between the stator main winding and the stator exciter winding is provided without interposing magnetic-field-isolation material.

2. The power system of claim 1 wherein the electric machine further comprises:
only one rotor core;
a rotor main winding wound on the one rotor core;
a rotor exciter winding wound on the one rotor core
wherein the rotor main winding and the rotor exciter winding are magnetically independent from one another; and
wherein magnetic separation between the rotor main winding and the rotor exciter winding is provided without interposing magnetic-field-isolation material.

3. The power system of claim 1:
wherein the electric machine is interposed between the engine of the vehicle and a transmission of the vehicle; and
wherein a rotor is adapted to deliver mechanical power from the engine of the vehicle to the transmission of the vehicle.

4. The power system of claim 1 further comprising:
a generator control unit (GCU) for controlling excitation of the electric machine responsively to variations of generator output voltage.

5. The power system of claim 4 wherein electrical power output of the electric machine has a constant voltage irrespective of the rotational speed of the engine of the vehicle or magnitude of electrical loads.

6. The power system of claim 1:
wherein the stator main winding is wound in a configuration with a first number of poles;
wherein the stator exciter winding is wound in a configuration with a second number of poles; and
wherein the first number of poles is larger than the second number of poles.

7. The power system of claim 6 wherein the first number of stator poles is an integer multiple of the second number of stator poles.

8. An electric machine comprising:
a common stator core surrounding an axis;
a stator exciter winding wound on the common stator core;
a stator main winding wound on the common stator core,
wherein the stator exciter winding produces stator-exciter-flux which interacts with the stator main winding to produce flux-induced voltage in the stator main winding but does not produce flux-induced current in the stator main winding,
wherein the stator main winding includes a first coil side and a second coil side configured to have positive voltages induced from the exciter winding that cancel each other,
wherein the stator main winding includes a third coil side and a fourth coil side configured to have negative voltages induced from the exciter winding that cancel each other, and
wherein the stator main winding produces stator-main-flux which interacts with stator exciter winding to produce flux-induced voltage in the stator exciter winding but does not produce flux-induced current in the stator exciter winding.

9. The electric machine of claim 8:
wherein the stator exciter winding is wound to provide an exciter pole configuration of a first number of poles;
wherein the stator main winding is wound to provide a main pole configuration of a second number of poles; and
wherein the first and second number of poles are different from one another.

10. The electric machine of claim 9 wherein the first number of poles is smaller than the second number of poles.

11. The electric machine of claim 9 wherein the first and second number of poles are integer multiples or divisors of each other.

12. The electric machine of claim 8:
wherein the common stator core comprises slots; and
wherein a first portion of the stator exciter winding and a first portion of the stator main winding are positioned in the same slot.

13. The electric machine of claim 12:
wherein at least one of the slots is occupied by a second portion of the stator main winding; and
wherein the at least one of the slots is not occupied by any portion of the stator exciter winding.

14. The electric machine of claim 8 further comprising:
a common rotor core surrounding the axis;
a rotor exciter winding wound on the common rotor core;
a rotor main winding wound on the common rotor core;
wherein the rotor exciter winding produces rotor-exciter-flux which interacts with rotor main winding to produce flux-induced voltage in the rotor main winding but does not produce flux-induced current in the rotor main winding; and
wherein the rotor main winding produces rotor-main-flux which interacts with rotor exciter winding to produce flux-induced voltage in the rotor exciter winding but does not produce flux-induced current in the rotor exciter winding.

15. A method for operating an electric machine comprising the steps of:
producing flux with a stator exciter winding wound on a common stator core;
inducing voltage in portions of a stator main winding wound on the common stator core so that there is no flux-induced current in the stator main winding as a result of flux from the stator exciter winding;
producing flux with the stator main winding wound on the common stator core,
wherein the stator main winding includes a first coil side and a second coil side configured to have positive voltages induced from the flux from the exciter winding, that cancel each other,
wherein the stator main winding includes a third coil side and a fourth coil side configured to have negative voltages induced from the flux from the exciter winding, that cancel each other; and
inducing voltage in portions of the stator exciter winding wound on the common stator core so that there is no flux-induced current in the stator exciter winding as a result of flux from the stator main winding and so that the electric machine is operable without intervening magnetic-field isolators between the stator main winding and the stator exciter winding.

16. The method of claim 15 further comprising the steps of:
producing flux with a rotor exciter winding wound on a common rotor core;
inducing voltage in portions of a rotor main winding wound on the common rotor core so that there is no flux-induced current in the rotor main winding as a result of flux from the rotor exciter winding;
producing flux with the rotor main winding wound on the common rotor core; and
inducing voltage in portions of the rotor exciter winding wound on the common rotor core so that there is no flux-induced current in the rotor exciter winding as a result of flux from the stator main winding.

17. The method of claim 16:
wherein the step of producing flux with the rotor exciter winding is performed with the rotor exciter winding wound in a pole configuration having a first number of rotor poles;
wherein the step of producing flux with the rotor main winding is performed with the rotor main winding wound in a pole configuration having a second number of rotor poles; and
wherein the first number of rotor poles differs from the second number of rotor poles.

18. The method of claim 15:
wherein the step of producing flux with the stator exciter winding is performed with the stator exciter winding wound in a pole configuration having a first number of stator poles;
wherein the step of producing flux with the stator main winding is performed with the stator main winding wound in a pole configuration having a second number of stator poles; and wherein the first number of stator poles differs from the second number of stator poles.

19. The method of claim 18 wherein the first number of poles is an integer multiple or divisor of the second number of poles.

20. The method of claim 18 wherein the first number of poles is smaller than the second number of poles.

* * * * *